United States Patent
Kephart et al.

(10) Patent No.: US 10,283,241 B1
(45) Date of Patent: May 7, 2019

(54) RESPONSIVE CRYOGENIC POWER DISTRIBUTION SYSTEM

(75) Inventors: Jacob T. Kephart, Garnet Valley, PA (US); Brian K. Fitzpatrick, Williamstown, NJ (US); Nathan N. Spivey, Swarthmore, PA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 1115 days.

(21) Appl. No.: 13/471,654

(22) Filed: May 15, 2012

(51) Int. Cl.
  *F25B 19/00* (2006.01)
  *H01B 12/14* (2006.01)
  *F17C 3/08* (2006.01)

(52) U.S. Cl.
  CPC ............. *H01B 12/14* (2013.01); *F17C 3/085* (2013.01); *F17C 2270/0527* (2013.01)

(58) Field of Classification Search
  CPC ... H01B 12/14; F17C 3/085; F17C 2270/0527
  USPC ......................................................... 174/15.5
  See application file for complete search history.

(56) References Cited

U.S. PATENT DOCUMENTS

| | | | |
|---|---|---|---|
| 3,504,868 A | 4/1970 | Engelberger | |
| 3,902,000 A * | 8/1975 | Forsyth | H02G 15/34 |
| | | | 174/15.3 |
| 5,327,731 A | 6/1994 | Markiewicz | |
| 6,027,077 A | 2/2000 | Eller et al. | |
| 6,342,673 B1 * | 1/2002 | Verhaege | H02G 15/34 |
| | | | 174/15.4 |
| 7,009,103 B2 | 3/2006 | Pitschi | |
| 7,395,675 B2 * | 7/2008 | Royal | H02G 15/34 |
| | | | 174/15.5 |
| 7,451,719 B1 | 11/2008 | Fitzpatrick et al. | |
| 7,484,370 B2 | 2/2009 | Kwon et al. | |

* cited by examiner

Primary Examiner — Tareq Alosh
(74) *Attorney, Agent, or Firm* — Dave A. Ghatt

(57) ABSTRACT

A responsive cryogenic power distribution system for maintaining cryogenic refrigeration throughout a superconducting network. The responsive cryogenic power distribution system includes a plurality of cryogenic cable arrangements and cryogenic cooling stations, arranged to form a single master closed loop arrangement and a plurality of sub closed loop arrangements, enclosed within the single master closed loop arrangement. The system also includes sensors and controllers that allow for reconfiguration in the event of a loss of one or more cryogenic cooling stations and/or one or more cryogenic cable arrangements.

1 Claim, 8 Drawing Sheets

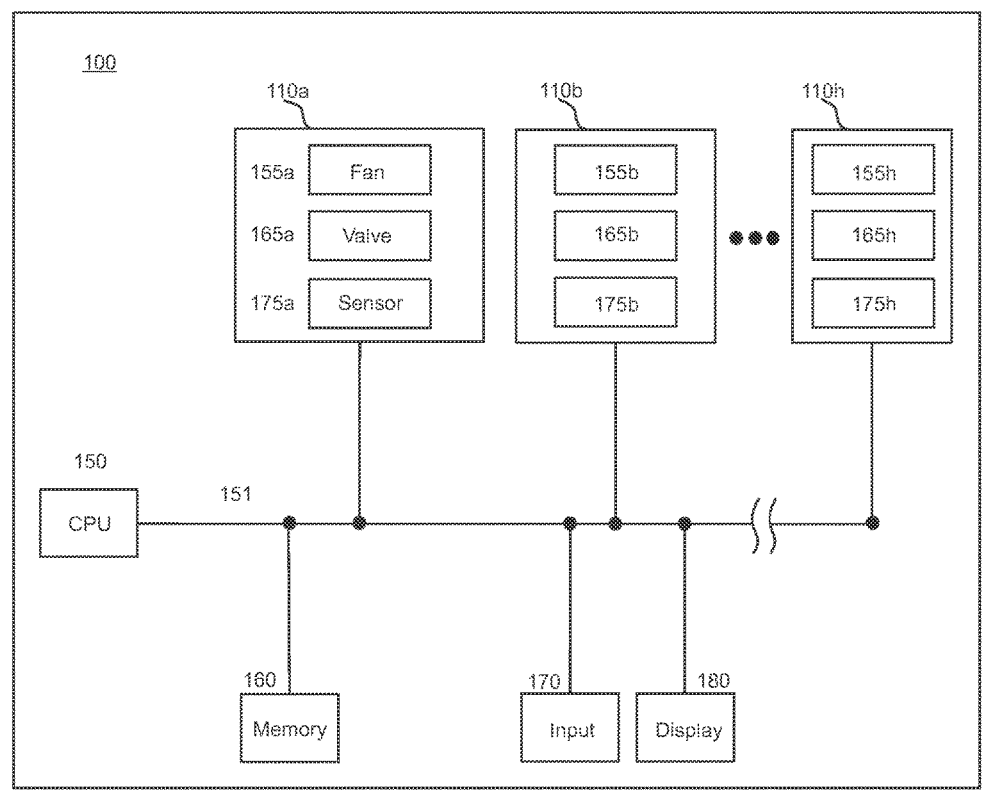

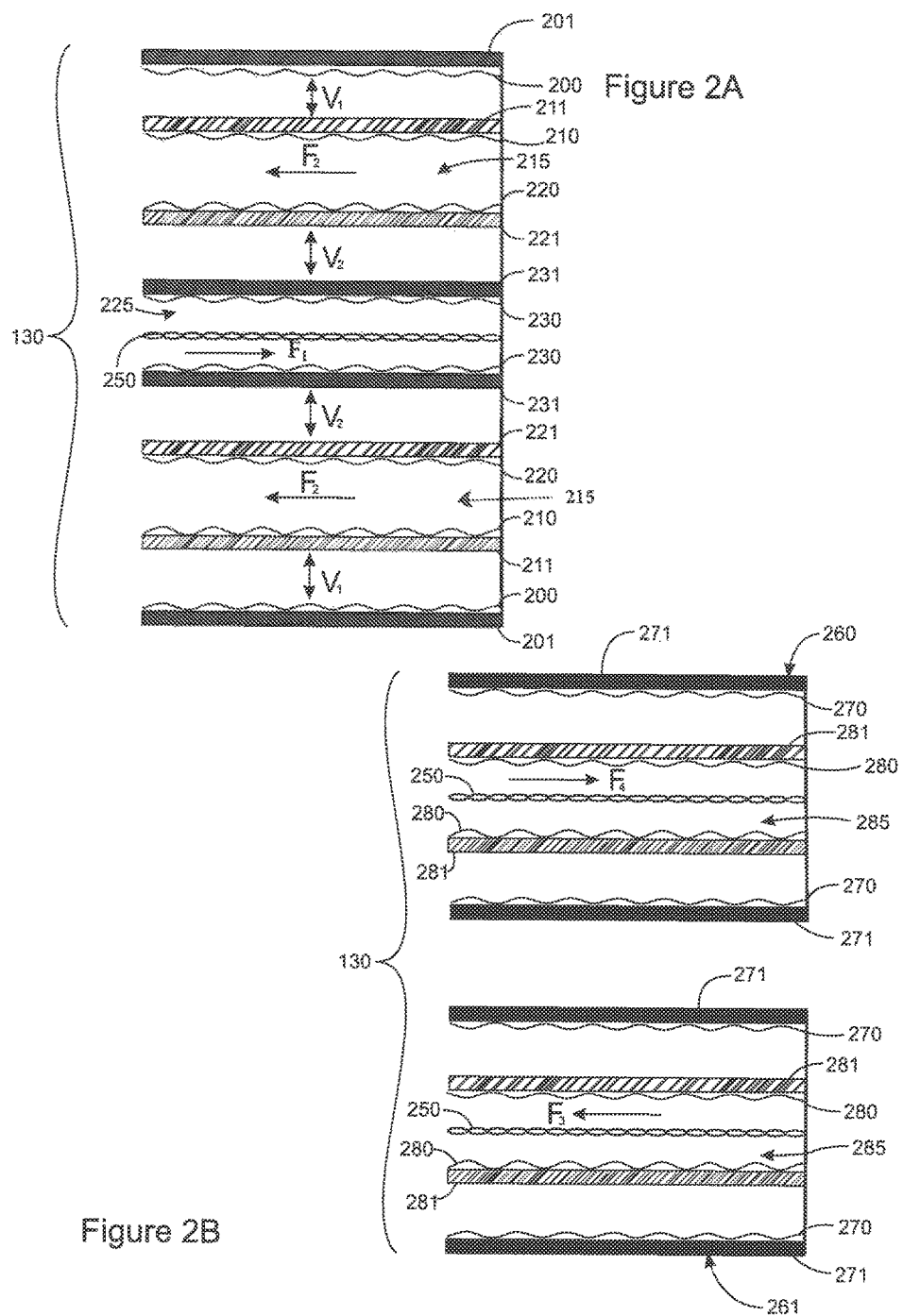

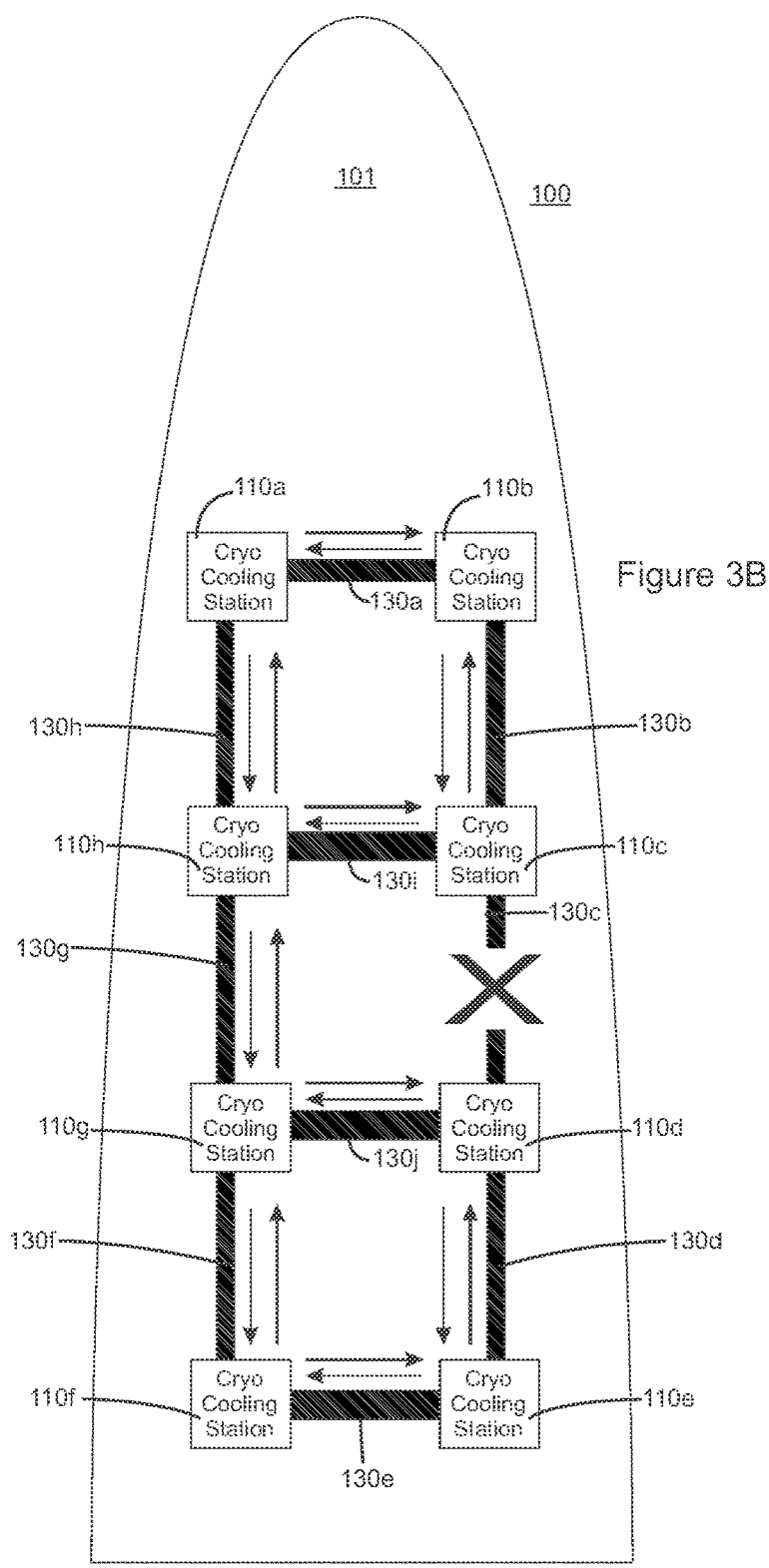

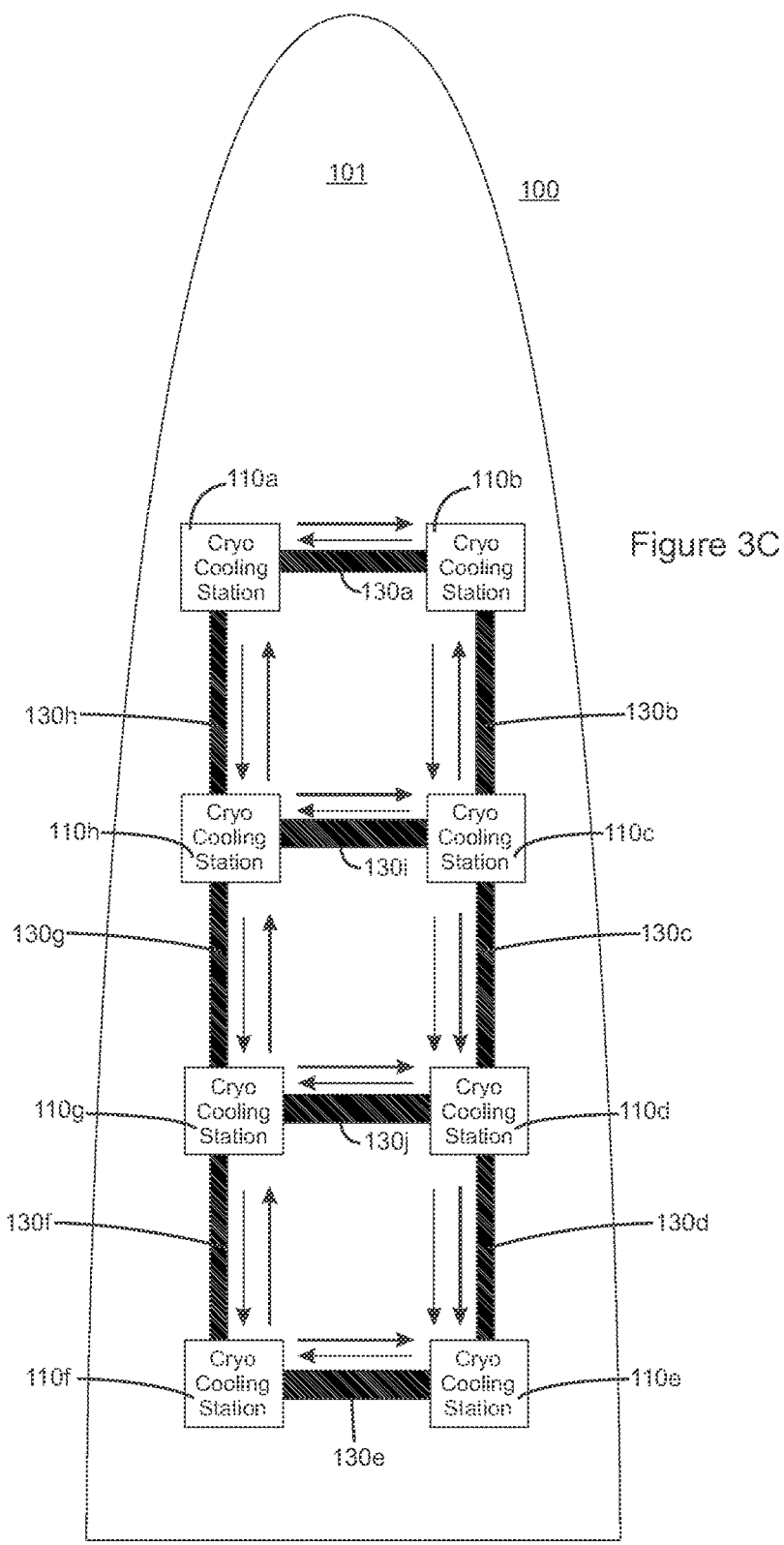

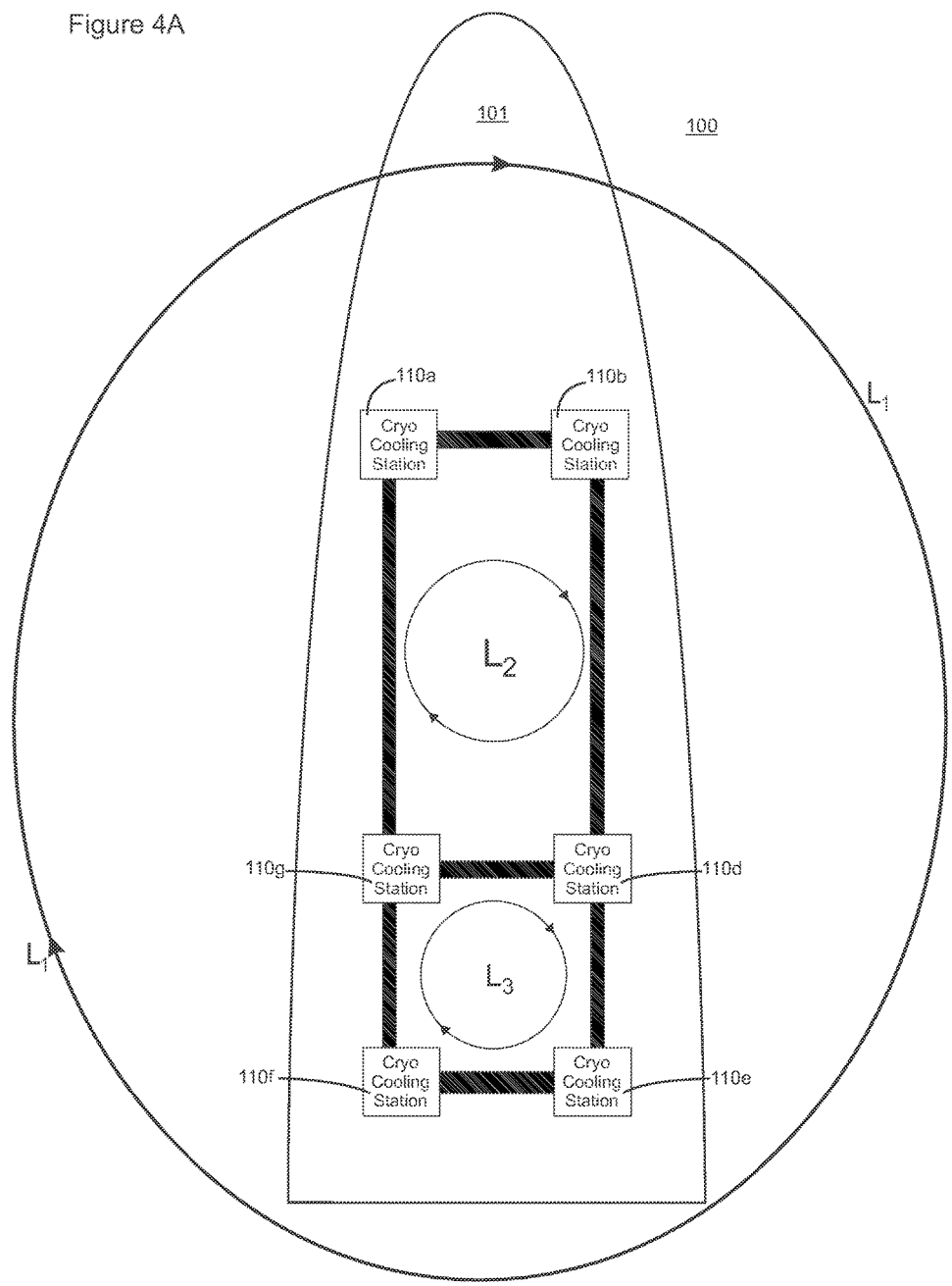

RESPONSIVE CRYOGENIC POWER DISTRIBUTION SYSTEM

STATEMENT OF GOVERNMENT INTEREST

The following description was made in the performance of official duties by employees of the Department of the Navy, and, thus the claimed invention may be manufactured, used, licensed by or for the United States Government for governmental purposes without the payment of any royalties thereon.

TECHNICAL FIELD

The following description relates generally to a responsive cryogenic power distribution system for maintaining cryogenic refrigeration throughout a superconducting network, and in particular, a power distribution system having a plurality of cryogenic cable arrangements and cryogenic cooling stations, sensors and a controller that allows for the reconfiguration of the flow of cryogen in the event of a loss of one or more cryogenic cooling stations and/or one or more cryogenic cable arrangements.

BACKGROUND

High temperature superconductors (HTS) are ceramic materials that exhibit zero resistance when cooled to below their superconducting transition temperature. Using superconductors for power distribution allows for significantly higher power density than legacy copper or aluminum wires. However HTS materials have to be maintained at operating temperatures, typically 30 to 80K (−243 to −193 C) in order to function properly. If a superconductor exceeds its designed temperature, it will not be able to carry the rated current and will quickly revert to or act as a normal conductor. When this happens, the superconductor effectively becomes a resistor and will transmit only the amount of current that can be sustained in its very thin metal stabilizer.

As outlined above, for proper operation of the HTS, cooling is required. Typically, a cryogen is circulated along the HTS power cables to provide the cooling. A cooling station is also used to maintain the cryogen at the desired temperature to provide the necessary cooling. HTS power cables typically use liquid nitrogen as the cryogen due to its availability, large thermal mass, ease of pumping, and dielectric properties. For Navy systems, using a liquid cryogen presents potential dangers of asphyxiation in the event of a system breach. Additionally LN2 has a lower temperature limit of 64K before it solidifies. For these reasons as well as the ability to achieve much colder temperatures, the Navy has been using gaseous helium as the cryogen for the majority of its HTS machines and systems and operates them around 30-50K. Since the gaseous helium isn't efficiently pumped, circulation is typically achieved through centrifugal fans. However, generally speaking, the prior art does not teach interconnected HTS power cables with multiple cooling stations forming a network, having the ability to reconfigure the circulation in the event that a cryogenic cooling station and/or a power cable is not functioning properly.

SUMMARY

In one aspect, the invention is a responsive cryogenic power distribution system for maintaining cryogenic refrigeration throughout a superconducting network. According to the invention, the responsive cryogenic power distribution system includes a plurality of cryogenic cable arrangements having a cryogen within. The system also includes a plurality of cryogenic cooling stations, each of the plurality of cryogenic cooling stations attached to at least two of the plurality of the cryogenic cable arrangements. In this aspect, the plurality of cryogenic cable arrangements and plurality of cryogenic cooling stations form a single master closed loop arrangement having a plurality of sub closed loop arrangements therewithin. The system also includes a system controller for controlling the directional flow of the cryogen within the single master closed loop and within the plurality of sub closed loop arrangements within the single master closed loop.

BRIEF DESCRIPTION OF THE DRAWINGS

Other features will be apparent from the description, the drawings, and the claims.

FIG. 1B is a block diagram of the responsive cryogenic power distribution system, according to an embodiment of the invention.

FIG. 2A is a sectional illustration of a cryogenic cable arrangement, according to an embodiment of the invention.

FIG. 2B is a perspective illustration of a cryogenic cable arrangement, according to an embodiment of the invention.

FIG. 3B is a schematic illustration of a responsive cryogenic power distribution system, showing reconfigured directional flow of the cryogen, according to an embodiment of the invention.

FIG. 3C is a schematic illustration of a responsive cryogenic power distribution system, showing reconfigured directional flow of the cryogen, according to an embodiment of the invention.

FIGS. 4A and 4B are schematic illustrations showing alternative exemplary arrangements for responsive cryogenic power distribution systems for maintaining cryogenic refrigeration throughout a superconducting network.

DETAILED DESCRIPTION

Figure 1A:
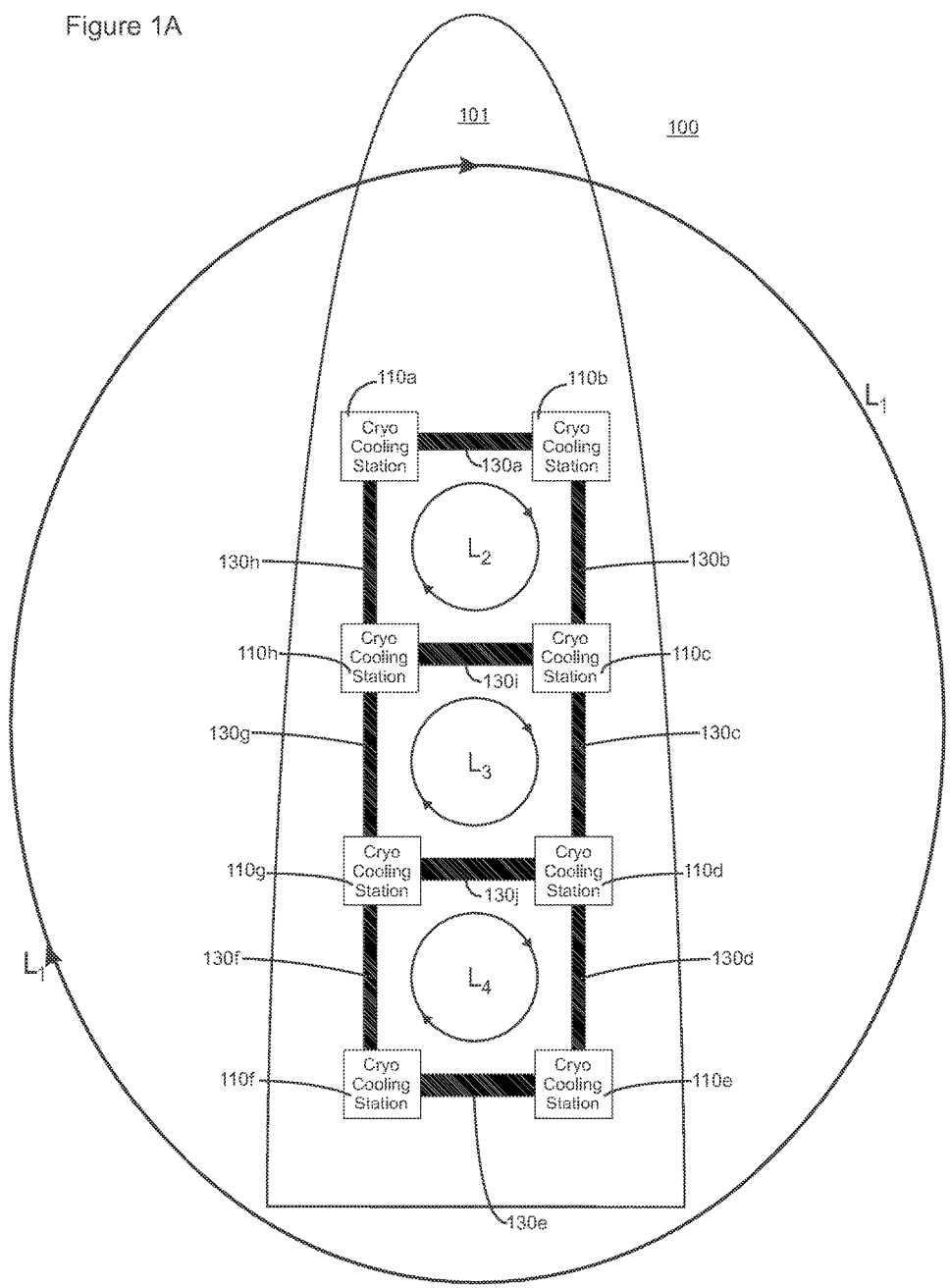
FIG. 1A is a schematic illustration of a responsive cryogenic power distribution system for maintaining cryogenic refrigeration throughout a superconducting network according to an embodiment of the invention.

FIG. 1A is an illustration of a responsive cryogenic power distribution system 100 for maintaining cryogenic refrigeration throughout a superconducting network according to an embodiment of the invention. The system 100 is provided in a vessel 101, such as a ship, a submarine, a spacecraft, or the like. As shown in FIG. 1, the system 100 includes a network of cryogenic cable arrangements ($130_a$, $130_b$ ... $130_j$). Each of the plurality of cryogenic cable arrangements ($130_a$, $130_b$ ... $130_j$) is substantially identical to the others. As outlined below, each cryogenic cable arrangement ($130_a$, $130_b$ ... $130_j$) includes a series of annuluses, which may be concentrically arranged. An inner annulus houses a high temperature superconductor (HTS) and a cryogen. The cryogen may be any desired cryogen such as liquid nitrogen or helium, or the like. According to a preferred embodiment, helium is used as the cryogen.

Throughout the network of cryogenic cable arrangements are cryogenic cooling stations ($110_a$, $110_b$ ... $110_h$). Each of the plurality of cryogenic cooling stations ($110_a$, $110_b$ ... $110_h$) is substantially identical to the others. The cryogenic cooling stations ($110_a$, $110_b$ ... $110_h$) cool and maintain the cryogen at a desired temperature for cooling the HTS. Each of the plurality of cryogenic cooling stations or "cryocoolers" operates on well known principles. According to the invention, each cryogenic cooling station ($110_a$, $110_b$ ... $110_h$) has adequate cooling capacity to cool multiple cryogenic cable arrangements in the event of failure of one or more of cryogenic coolers, cable arrangements, or combinations thereof. Each cryogenic cooling station has a cryogen circulating system that is compatible with the cryogen. For example, when the cryogen is the helium, the circulation system would include centrifugal fans, and when the cryogen is liquid nitrogen, the circulation system would include pumps. The circulation system also has valves to isolate, redirect, or boost cryogen flow through the cables. The cryogenic cooling stations ($110_a$, $110_b$ ... $110_h$) may have local cryogen reserve storage either at cryogenic temperatures or compressed storage at ambient temperatures.

FIG. 1A also shows the arrangement of the overall superconducting network. As illustrated, the plurality of cryogenic cable arrangements cryogenic cable arrangements ($130_a$, $130_b$ ... $130_j$) and the plurality of cryogenic cooling stations ($110_a$, $110_b$ ... $110_h$) form a single master closed loop arrangement $L_1$. Also shown is a plurality of sub closed loop arrangements, $L_2$, $L_3$, and $L_4$, enclosed within the single master closed loop arrangement $L_1$. As outlined below, the responsive cryogenic power distribution system 100 is designed to circulate a cryogen through the single master closed loop $L_1$, and also through each of the sub closed loop arrangements $L_2$, $L_3$, and $L_4$. Depending on the conditions within the system, the cryogen may be circulated simultaneously through loops $L_1$, $L_2$, $L_3$, and $L_4$. As shown, each two adjacent sub closed loop arrangements share a common cable arrangement. For example, as shown, adjacent loops $L_3$ and $L_4$ share a common cable arrangement $130_j$. Alternatively, if one or more of the cryogenic coolers and/or cable arrangements are not functioning properly, the cryogen may be circulated only through portions of one or more of the loops $L_1$, $L_2$, $L_3$, and $L_4$ to isolate, redirect, or boost cryogen flow through the cables. As outlined below, although FIG. 1A shows an arrangement having eight cryocoolers ($110_a$, $110_b$ ... $110_h$) and 10 cable arrangements ($130_a$, $130_b$ ... $130_j$), other arrangements having more or less coolers and cables are possible.

FIG. 1B is a block diagram of the responsive cryogenic power distribution system 100, according to an embodiment of the invention. As outlined above with respect to FIG. 1A, the system 100 may be provided in a vessel such as a surface water ship, a submarine, a spacecraft, or the like. FIG. 1B shows the system 100 including a CPU 150 for controlling the operations of the system 100. The CPU controlled operations include, amongst other things, configuring and reconfiguring the flow of cryogen through the loops $L_1$, $L_2$, $L_3$, and $L_4$, based on detected conditions. The responsive cryogenic power distribution system 100 also includes a main memory 160, which may be RAM, ROM, combinations thereof, or the like. The system may also include an input device 170 and a display 180. According to an embodiment, the input 170 and display 180 may be a single device such as a touch screen display or the like. Even though the system 100 preferably operates automatically, the system may include manual operation modes of operation.

As shown in FIG. 1B, the system 100 also includes cryogenic cooling stations ($110_a$, $110_b$ ... $110_h$). Each cryogenic cooling station ($110_a$, $110_b$ ... $110_h$) includes one or more valves ($155_a$, $155_b$ ... $155_h$), and one or more cryogen distributors ($165_a$, $165_b$ ... $165_h$). In cooling station $110_a$ for example, the one or more valves are represented by $155_a$, and the one or more cryogen distributors represented by $165_a$. According to this embodiment, the cryogen used is helium, and thus the cryogen distributors are centrifugal fans. However it is foreseen that other cryogens, such as liquid nitrogen may be used, and therefore a pump may be used instead of the fans of the present embodiment. The one or more valves may be solenoid valves, which are triggered to direct the helium into desired paths.

The cryogenic cooling stations ($110_a$, $110_b$ ... $110_h$) each include one or more sensors ($175_a$, $175_b$ ... $175_h$) for detecting the operational status of the cooling stations and for detecting the circulation status between cooling stations. According to an embodiment, the sensors ($175_a$, $175_b$ ... $175_h$) may have additional elements positioned within the various cryogenic cable arrangements ($130_a$, $130_b$ ... ) to ascertain the status of cable arrangements. As shown, each of the constituent elements of the system 100 is connected to one another through a bus 151, so that the necessary information can be transmitted to the constituent elements. As outlined below, the system 100 is equipped to, and runs a flow configuration program that configures and reconfigures the flow paths and flow directions within the single master closed loop $L_1$, and also through each of the sub closed loop arrangements $L_2$, $L_3$, and $L_4$. The program allows for automatic and manual operation. The flow configuration program may be stored on the memory 170.

FIG. 2A is a longitudinal sectional illustration of a cryogenic cable arrangement 130, according to an embodiment of the invention. The cryogenic cable arrangement 130 of FIG. 2A is representative of each of the cable arrangements ($130_a$, $130_b$ ... $130_j$) shown in FIG. 1A. As shown, the cryogenic cable arrangement 130 is made up of several concentric tubes and annuluses with a high temperature superconducting cable (HTC) 250 substantially at the center of the concentric tube arrangement. The HTC cable 250 illustrated may be plurality of cables that function as a single unit. FIG. 2A shows an outer tube 200, which may be a corrugated steel tube, or the like. The outer tube 200 may preferably be protected by an abrasion jacket, which may be a polymer coating or the like. At the innermost region of the tube 200 is an inner tube 230, which may also be corrugated stainless steel or the like. The outer side of the tube 230 is preferably coated with a radiation shield 231, such as reflective aluminized Mylar. The high temperature superconducting cable 250 is positioned within the inner tube 230. As stated above, the HTC cable 250 may be a plurality of cables that function as a single unit. As discussed below, a cryogen is circulated in the conduit 225 within the inner tube 230, which directly cools high temperature superconductor cable 250.

As shown, the cable arrangement 130 includes additional annuluses between the outer tube 200 and the inner tube 230, creating an additional cryogen conduit 215 and two distinct annular vacuumed regions $V_1$ and $V_2$. FIG. 2A illustrates a spacer ring 210 within the outer tube 200. The spacer ring 210 may also be a stainless steel corrugated tube, and may have a radiation insulation coating 211, such as reflective aluminized Mylar, for example. As shown, the coating 211 is provided on the outer side of the spacer ring 210. As shown, the vacuumed region $V_1$ is created between the spacer ring 210 and the outer tube 200.

FIG. 2A also shows a spacer ring 220 surrounding the inner tube 230, which also be a stainless steel corrugated tube having a radiation insulation coating 221. However, as shown in FIG. 2A, the coating 221 on the inside of the spacer ring 221. The vacuumed region $V_2$ is created between the spacer ring 220 and the inner tube 230. Cryogen conduit 215 is created between spacer rings 210 and 220. $F_1$ in cryogen conduit 225 and $F_2$ in cryogen conduit 215, as shown in FIG. 2A, indicates the directional flow of the cryogen in the respective conduits. FIG. 2A shows these flows $F_1$ and $F_2$ to be opposite to each other, thereby enabling the bi-directional flow of cryogen in each cable arrangement 130. It should be noted that although FIG. 2A shows $F_1$ going to the right and $F_2$ going to the left, the arrows merely illustrate the bidirectional capabilities of the cable arrangement 130. Alternatively, the $F_1$ flow may be directed left and the $F_2$ flow may be directed right. Also, the $F_1$ and $F_2$ flows may be in the same direction. Both the cryogen $F_1$ and $F_2$ flows provide cooling to the HTS cable 250. As shown, the flows $F_1$ and $F_2$ are directed about a common longitudinal axis, which substantially coincides with the HTS cable 250.

FIG. 2B is a perspective illustration of a cryogenic cable arrangement 130, according to an embodiment of the invention. As opposed to single tube concentric arrangement of FIG. 2A, the FIG. 2B arrangement has two side-by-side tubes 260 and 261, which are arranged to be substantially parallel to each other. Each tube (260, 261) includes a HTS cable 250 running through a central portion of each respective tube. Although in the FIG. 2B arrangement, the HTS cables 250 are separate from each other, the cables function as a single unit. Because the cables of 250 function as a single unit, if one of the two cables 250 shown in FIG. 2B is not functioning properly, then the entire cable arrangement 130 will be compromised.

A cryogen, as described above, may be circulated through each tube 260 and 261. The flow may be directed in opposite directions, as shown, thereby providing bidirectional flow. The flows of FIG. 2B are represented by $F_3$ and $F_4$. As opposed to the flow of FIG. 2A $F_1$ and $F_2$, which have a common flow axis, the flows of FIG. 2B $F_3$ and $F_4$ are about different substantially parallel axes. It should be noted that although FIG. 2B shows $F_3$ going to the right and $F_4$ going to the left, the arrows merely illustrate the bidirectional capabilities of the cable arrangement 130. Alternatively, the $F_3$ flow may be directed left and the $F_4$ flow may be directed right. Also, the $F_3$ and $F_4$ flows may be in the same direction. Both the cryogen $F_3$ and $F_4$ flows provide cooling to the HTS cable 250.

The tubes 260 and 261 of FIG. 2B may have identical structures. As shown each tube may include an outer tube 270, which may be a corrugated steel tube, or the like. The outer tube 270 may preferably be protected by an abrasion jacket 271, which may be a polymer coating or the like. Within the outer tube 270, there is spacer ring 280, which may also be a stainless steel corrugated tube, and may have a radiation insulation coating 281, such as reflective aluminized Mylar, for example. The coating 281 is provided on the outer side of the spacer ring 280. As shown, a vacuumed region $V_3$ is created between the spacer ring 280 and the outer tube 270. FIG. 2B also shows a cryogen conduit 285, through which cryogen is circulated, formed within the spacer ring 280. The HTS cable 250 is runs through the cryogen conduit 285.

Figure 3A:
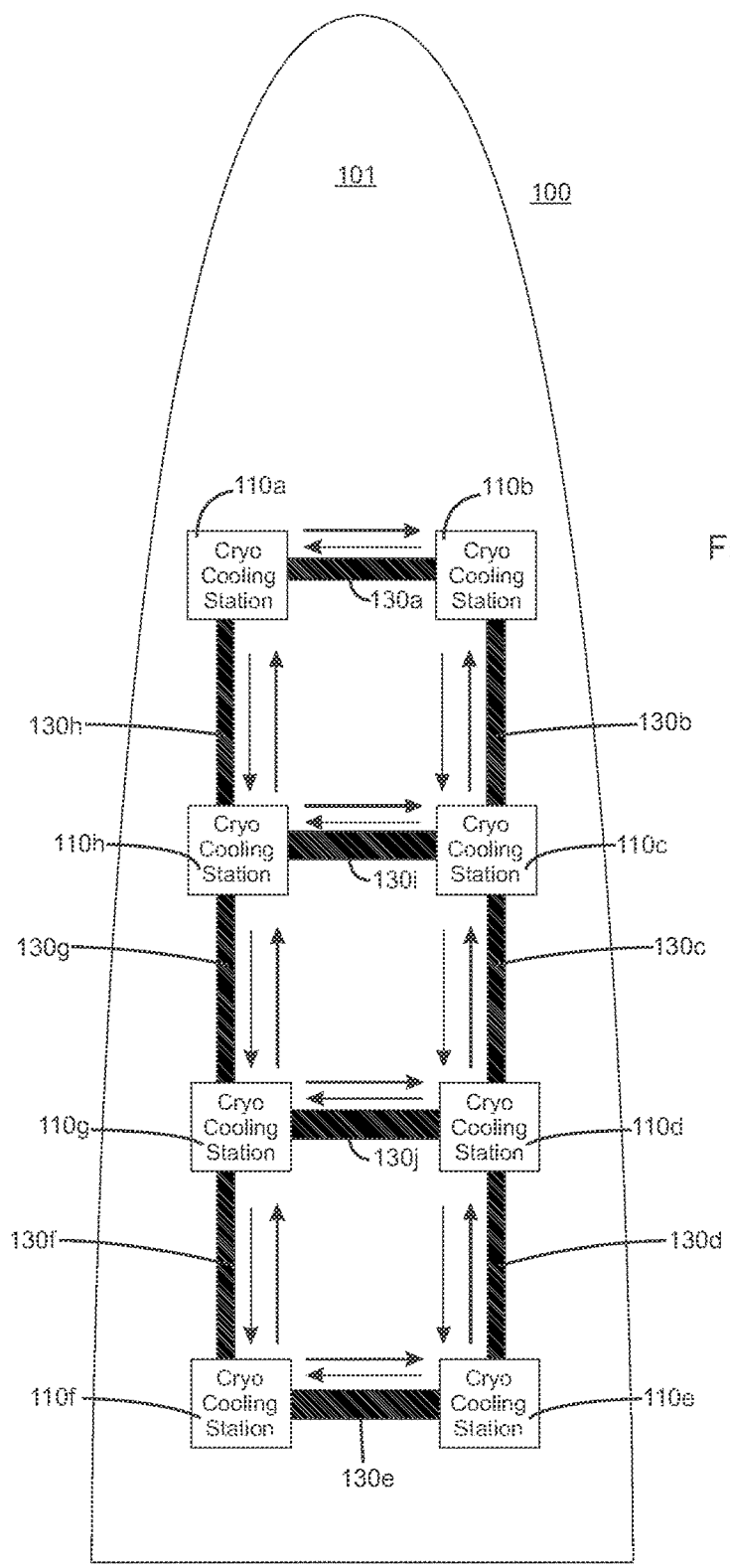
FIG. 3A is a schematic illustration of a responsive cryogenic power distribution system, showing the directional flow of the cryogen, according to an embodiment of the invention.

FIG. 3A is an illustration of a responsive cryogenic power distribution system 100, showing the directional flow of the cryogen, according to an embodiment of the invention. The directional flow as illustrated in FIG. 3A is applicable to embodiments having cable arrangements 130, as illustrated in FIG. 2A and FIG. 2B. The arrows show the bi-directional flow of cryogen in each cable arrangement ($130_a$, $130_b$ . . . $130_j$), thereby showing the flow of cryogen throughout the single master closed loop $L_1$, and the sub closed loops $L_2$, $L_3$, and $L_4$. The flow of cryogen in each loop ($L_1$, $L_2$, $L_3$, $L_4$) may be conducted simultaneously. As discussed below, the directional flow of cryogen shown in FIG. 3A may be a default flow regime of the system 100. Alternatively, the default flow regime may be one in which some of the cable arrangements have unidirectional flow.

FIG. 3B is an illustration of a responsive cryogenic power distribution system 100, showing reconfigured directional flow of the cryogen, according to an embodiment of the invention. The directional flow as illustrated in FIG. 3B is applicable to embodiments having cable arrangements 130, as illustrated in FIGS. 2A and 2B. Regarding the embodiment of FIG. 2B, as stated above, if one of the two cables 250 shown in FIG. 2B is not functioning properly, then that entire cable arrangement 130 will not function properly. FIG. 3B shows the reconfigured flow when the CPU 150 determines that cable arrangement 130, is not functioning properly. As shown, the flow of cryogen is redirected and isolated from cable arrangement $130_c$. FIG. 3C is an illustration of a responsive cryogenic power distribution system 100, showing reconfigured directional flow of the cryogen, according to an embodiment of the invention. The directional flow as illustrated in FIG. 3C is also applicable to embodiments having cable arrangements 130, as illustrated in FIGS. 2A and 2B. FIG. 3C shows a reconfigured flow when the CPU 150 determines that cooling station $110_d$ is not functioning. FIG. 3C illustrates one of a plurality of reconfigured flows, in which the flow is increased and pushed through the cryogenic cooling station $110_d$. Also in order to decrease power consumption in that situation, the flow through the cooling station $110_d$ may be changed to a unidirectional flow.

The reconfigured flow as illustrated in FIGS. 3B and 3C, as well as other cryogen flow reconfigurations can be explained with by outlining the operation of the CPU 150 and the other elements of the system 100 shown in FIG. 1B. As stated above, the system 100 is equipped to, and runs a flow configuration program stored on the memory 170 that configure and reconfigure the flow paths and flow directions within the single master closed loop $L_1$, and also through each of the sub closed loop arrangements $L_2$, $L_3$, and $L_4$. The flow configuration program allows for automatic and manual operation.

The responsive cryogenic power distribution system 100 utilizes data detected by the sensors ($175_a$, $175_b$ . . . $175_h$). As outlined above, each of the one or more sensors ($175_a$, $175_b$ . . . $175_h$) are positioned in the cryogenic cooling stations ($110_a$, $110_b$ . . . $110_h$) to determine the operational status of the cooling stations, such as whether the stations are cooling the cryogen properly, or the stations are utilizing excess energy to cool the cryogen, e.g. The one or more sensors ($175_a$, $175_b$ . . . $175_h$) may have additional elements positioned within the various cryogenic cable arrangements ($130_a$, $130_b$ . . . $130_h$) to ascertain the status of the cable arrangements, such as if there are blockages or leaks, or general damage to the cable arrangement. The sensors ($175_a$, $175_b$ . . . $175_h$) may constantly evaluate the respective coolers ($110_a$, $110_b$ . . . $110_h$) and cables ($130_a$, $130_b$ . . . $130_j$), and transmit this evaluation data to the CPU 150. The CPU 150 uses the data stream and executes the flow configuration program in a known manner.

Typically, the responsive cryogenic power distribution system 100 operates in a default operation mode. The default operation mode may be as illustrated in FIG. 3A, in which each of the cryogenic cable arrangements ($130_a$, $130_b$ ... $130_j$) circulates the cryogen in a bidirectional manner. As outlined above, the bidirectional flow is provided by the cable arrangement as shown in FIG. 2A, in which the cable has concentric conduits 215 and 225. When the sensors ($175_a$, $175_b$ ... $175_h$) detect that the cryogenic coolers ($110_a$, $110_b$ ... $110_h$) and the cable arrangements ($130_a$, $130_b$ ... $130_j$) are operating properly, this data is transmitted to the CPU 150. The status of the system 100 may be illustrated on the display 180. By execution of the flow configuration program, the CPU 150 would allow the system 100 to continue to operate in the default operation mode shown in FIG. 3A. It should be noted that the system may operate in default modes, other than the illustrated mode of FIG. 3A. For example, the flow of cryogen in each cable arrangement ($130_a$, $130_b$ ... $130_j$) may also be unilateral, or the system may include a combination of unilateral flow cables and bidirectional flow cables. The default operation mode may be preprogrammed, or may be entered by a user via the input device 170.

If for example, the sensors ($175_a$, $175_b$ ... $175_j$) detect that one or more cable arrangements ($130_a$, $130_b$ ... $130_j$) are clogged, leaking, damaged, or for some other reason, faulty, this information is transmitted to the CPU 150. By execution of the flow configuration program, the CPU 150 reconfigures the flow of cryogen in the system to accommodate for the damaged cable arrangement or arrangements. For example, in the embodiment shown in FIG. 3B, the sensors detect that the cable arrangement $130_c$ is not operating properly. This information is transmitted to the CPU 150, and the CPU 150 reconfigures the flow, as shown, so that all the flow to the cable arrangement $130_c$ is cut off, thus minimizing the loss of cryogen or energy, and maintaining desired temperatures throughout the system 100. Thus in changing from the default mode to the reconfigured mode, the CPU 150 adjusts the valves ($155_c$, $155_d$) and fans ($165_c$, $165_d$) in the cryocoolers ($110_c$, $110_d$) to lock off the flow to the cable arrangement $130_c$, as shown in FIG. 3B. As stated above, the status of the system 100, showing the improperly functioning cable arrangement 130, may be illustrated on the display 180. Alternatively, a user may manually enter, via input 170, a desired reconfigured mode of cryogen flow in the system 100.

If for example, the sensors ($175_a$, $175_b$ ... $175_j$) detect that one or more of the cryogenic coolers ($110_a$, $110_b$ ... $110_h$) are not cooling, leaking, or not operating properly, this information is transmitted to the CPU 150. By execution of the flow configuration program, the CPU 150 reconfigures the flow of cryogen in the system to accommodate for the damaged cooler or coolers. For example, in the embodiment shown in FIG. 3C, the sensor $175_d$ detects that the cooler $110_d$ is not operating properly. This information is transmitted to the CPU 150, and the CPU 150 reconfigures the flow, as shown, so that all the flow of cryogen is pushed through the cryogenic cooler $110_d$ to save energy by avoiding any recirculation at the cooler $110_d$ and pushing the cryogen to the cooling station $110_e$, which according to the embodiment, is still operating properly. Thus in changing from the default mode to the reconfigured mode, the CPU 150 adjusts the valves ($155_c$, $155_d$ $155_e$, $155_g$) and fans ($155_c$, $155_d$ $155_e$, $155_g$) in the cryocoolers ($110_c$, $110_d$ $110_e$, $110_g$) to redirect the flow regime, as shown in FIG. 3C. The reconfiguration of the flow also minimizes the loss of energy, and maintains desired temperatures throughout the system 100.

As stated above, the status of the system 100, showing the improperly functioning cryogen cooling station $110_c$ may be illustrated on the display 180. Alternatively, a user may manually enter, via input 170, a desired reconfigured mode of cryogen flow in the system 100.

Figure 4B:
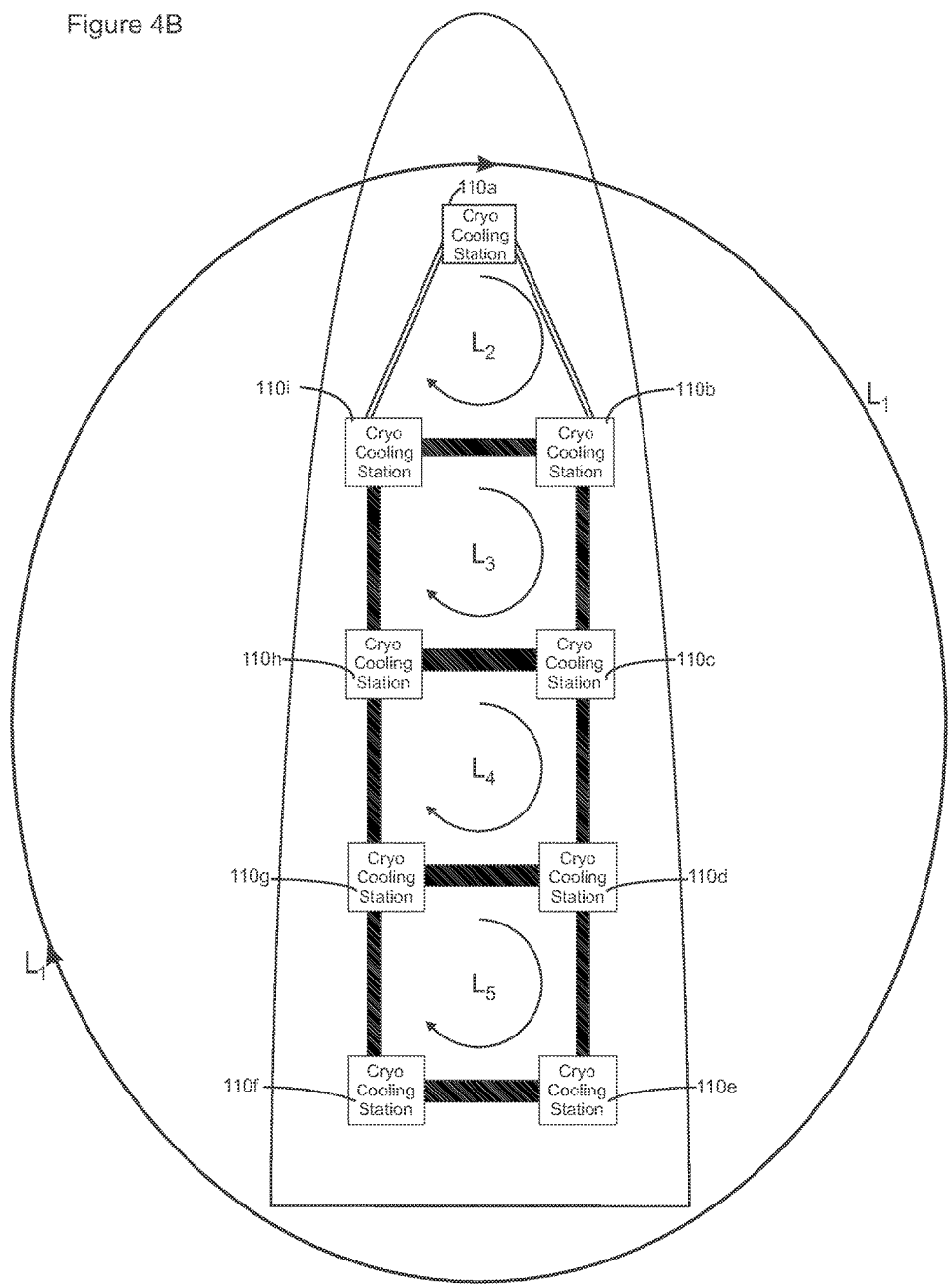

It should be noted that although FIG. 1A shows the responsive cryogenic power distribution system 100 having eight cryogen cooling stations ($110_a$, $110_b$ ... $110_h$) and ten interconnected cable arrangements ($130_a$, $130_b$ ... $130_j$), other power distribution system arrangements are possible having more or less cryogen cooling stations and more or less cable arrangements. FIGS. 4A and 4B show alternative power distribution system arrangements having a single master closed loop $L_1$, and several sub closed loops within the single master closed loop $L_1$. In FIG. 4A shows two sub closed loop arrangements ($L_2$,$L_3$) within the single closed loop $L_1$. FIG. 4B shows four sub closed loop arrangements ($L_2$,$L_3$, $L_4$,$L_5$) within the single closed loop $L_1$. It should also be noted that the elements as shown in FIG. 1B, including CPU programming, is adjusted depending on the arrangement of FIGS. 4A-4C, so that regardless of the matrix of the network, the system 100 functions as desired to maintain cryogenic refrigeration throughout a superconducting network.

The instant invention provides many advantages over conventional cryogenic cooling systems. These advantages include the use of multiple cooling stations and the ability to adjust the flow of cryogen, when some elements are not operating properly, thereby still maintaining proper cryogenic cooling throughout the system. The instant invention may also provide significant energy savings.

What has been described and illustrated herein are preferred embodiments of the invention along with some variations. The terms, descriptions and figures used herein are set forth by way of illustration only and are not meant as limitations. Those skilled in the art will recognize that many variations are possible within the spirit and scope of the invention, which is intended to be defined by the following claims and their equivalents, in which all terms are meant in their broadest reasonable sense unless otherwise indicated.

What is claimed is:

1. A responsive cryogenic power distribution system for maintaining cryogenic refrigeration throughout a superconducting network, the responsive cryogenic power distribution system comprising:
   a plurality of cryogenic cable arrangements having a cryogen within;
   a plurality of cryogenic cooling stations, each of the plurality of cryogenic cooling stations attached to at least two of the plurality of the cryogenic cable arrangements, wherein the plurality of cryogenic cable arrangements and plurality of cryogenic cooling stations form a single master closed loop arrangement $L_1$, consisting of a plurality of sub closed loop arrangements $L_2$, $L_3$, and $L_4$, therewithin; and
   a system controller for controlling the directional flow of the cryogen within the single master closed loop and within the plurality of sub closed loop arrangements within the single master closed loop, wherein the plurality of sub closed loop arrangements $L_2$, $L_3$, and $L_4$, are arranged in a single row so that sub closed loop arrangement $L_2$ is adjacent to sub closed loop arrangement $L_3$, and wherein sub closed loop arrangement $L_3$ is adjacent to sub closed loop arrangement $L_4$, and wherein sub closed loop arrangements $L_2$ and L are not adjacent to each other, wherein each two adjacent sub closed loop arrangement share a common cryogenic cable arrangement, and wherein the single master closed loop arrangement consists of eight cryogenic cooling stations, and each of the of sub closed loop arrangements $L_2$, $L_3$, and L, consists of four cooling stations, wherein the responsive cryogenic power distribution system further comprises:

one or more centrifugal fans at each cryogenic cooling station for circulating the cryogen throughout the single master closed loop and the plurality of sub closed loop arrangements;

one or more valves at each of cryogenic cooling station for directing the flow of cryogen at each cryogenic cooling station; and one or more sensors at each cryogenic cooling station for detecting the operational status of the cooling station and for detecting the circulation status between cooling stations, wherein the system controller is operationally connected to each of centrifugal fans, the valves, and the sensors, for controlling the directional flow of the cryogen within the single master closed loop and within the plurality of sub closed loop arrangements within the single master closed loop, and wherein each of the cryogenic cable arrangements comprises a series concentric tubes and annuluses, and a high temperature superconducting cable at the center of the concentric tube arrangement, the annuluses providing first and second cryogen conduits providing simultaneous bidirectional flow of cryogen within each cryogenic cable arrangement, wherein each of the first and second cryogen conduits have a longitudinal flow axis that is parallel to the high temperature superconducting cable, wherein each of the cryogenic cable arrangements further comprises two distinct annular vacuumed regions, wherein the two distinct annular vacuumed regions are located between the first and the second cryogen conduits, and the series concentric tubes and annuluses comprise, an outer tube having a cryogen flow in a first direction and an inner tube having a cryogen flow in a second direction opposite to the first direction, a first spacer ring within the outer tube, and a second spacer ring surrounding the inner the inner tube, each of the first and second spacer rings having a radiation insulation coating, and wherein a first of the two distinct annular vacuumed regions is located between the outer tube and the first spacer ring, and a second of the two distinct annular vacuumed regions is located between the inner tube and the second spacer ring, and wherein the system controller controls the centrifugal fans and valves to provide bidirectional flow of cryogen in each of the plurality of cryogenic cable arrangements, and wherein, the system controller controls the centrifugal fans and valves to direct the flow of cryogen in a continuous clockwise loop in each of the of sub closed loop arrangements $L_2$, $L_3$, and $L_4$, resulting in a clockwise flow of cryogen in the single master closed loop arrangement $L_1$.

* * * * *